US008698873B2

(12) United States Patent
Barrus

(10) Patent No.: US 8,698,873 B2
(45) Date of Patent: Apr. 15, 2014

(54) VIDEO CONFERENCING WITH SHARED DRAWING

(75) Inventor: John Barrus, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 474 days.

(21) Appl. No.: 13/041,838

(22) Filed: Mar. 7, 2011

(65) Prior Publication Data

US 2012/0229590 A1 Sep. 13, 2012

(51) Int. Cl.
*H04N 7/14* (2006.01)
*H04L 12/18* (2006.01)
*G09G 5/00* (2006.01)

(52) U.S. Cl.
USPC ........ 348/14.08; 250/221; 345/156; 345/158; 345/179; 345/582; 345/629; 347/109; 348/14.01; 348/148; 348/207.1; 348/333.02; 375/240.16; 380/279; 382/154; 382/241; 434/408; 701/431; 709/204; 713/163; 713/182; 715/230; 715/733; 715/735; 715/751

(58) Field of Classification Search
CPC ... H04N 19/00472; G06F 15/16; G06Q 50/30
USPC .......... 250/221; 345/156, 158, 173, 179, 433, 345/582, 629; 348/14.01, 14.08, 333.02, 348/148, 207.1; 709/204; 713/182, 300, 713/163; 347/109; 375/240.16; 380/279; 382/154, 241; 434/408; 701/209, 431; 715/230, 733, 735, 751
See application file for complete search history.

(56) References Cited

U.S. PATENT DOCUMENTS

| 5,025,314 A * | 6/1991 | Tang et al. ................. 348/14.08 |
| 5,400,069 A | 3/1995 | Braun et al. |
| 5,570,301 A | 10/1996 | Barrus |
| 5,790,114 A | 8/1998 | Geaghan et al. |

(Continued)

FOREIGN PATENT DOCUMENTS

| JP | 2009-151508 A | 7/2009 |
| JP | 2012-507052 A | 3/2012 |
| WO | 2010/100157 A1 | 9/2010 |

OTHER PUBLICATIONS

Katz, "Chemistry in the Toy Store™", 6th Edition, Updated 2002, 13 pages.

(Continued)

*Primary Examiner* — Gerald Gauthier
(74) *Attorney, Agent, or Firm* — Kilpatrick Townsend & Stockton LLP

(57) ABSTRACT

Techniques for enabling video conferencing with interactive sharing of drawings and/or other information. In one set of embodiments, a system is provided that includes a drawing surface, a video camera embedded or integrated into the drawing surface, and a front projector. The drawing surface can capture drawings made on the surface by a user, and the video camera can capture a video stream of the user. The system can send digital information representing the captured drawings and the video stream to a remote system. The system can also receive digital information representing drawings made by a remote user and a video stream of the remote user from the remote system. The front projector can project a video signal onto the drawing surface that incorporates the captured drawings, the drawings made by the remote user, and the video stream of the remote user.

20 Claims, 5 Drawing Sheets

(56) References Cited

U.S. PATENT DOCUMENTS

| | | | |
|---|---|---|---|
| 5,844,569 A * | 12/1998 | Eisler et al. | 345/619 |
| 6,070,247 A * | 5/2000 | Wallace et al. | 713/300 |
| 6,707,444 B1 | 3/2004 | Hendriks et al. | |
| 6,772,335 B2 * | 8/2004 | Curtis et al. | 713/163 |
| 6,917,033 B2 * | 7/2005 | Hendriks et al. | 250/221 |
| 6,963,334 B1 * | 11/2005 | Stevens et al. | 345/179 |
| 6,985,620 B2 * | 1/2006 | Sawhney et al. | 382/154 |
| 7,170,526 B1 * | 1/2007 | Johnson | 345/582 |
| 7,219,233 B1 * | 5/2007 | Hendriks et al. | 713/182 |
| 7,242,389 B1 * | 7/2007 | Stern | 345/158 |
| 7,355,584 B2 * | 4/2008 | Hendriks et al. | 345/156 |
| 7,554,576 B2 | 6/2009 | Erol et al. | |
| 7,634,540 B2 * | 12/2009 | Ivashin et al. | 709/204 |
| 7,791,597 B2 | 9/2010 | Silverstein et al. | |
| 8,125,510 B2 * | 2/2012 | Agarwal et al. | 348/14.08 |
| 8,180,567 B2 * | 5/2012 | Geelen et al. | 701/431 |
| 8,195,952 B2 | 6/2012 | Andreev et al. | |
| 8,234,578 B2 | 7/2012 | Ferren et al. | |
| 8,352,180 B2 * | 1/2013 | Geelen et al. | 701/431 |
| 8,355,038 B2 * | 1/2013 | Robinson et al. | 348/14.01 |
| 8,390,718 B2 * | 3/2013 | Robinson et al. | 348/333.02 |
| 2001/0051876 A1 | 12/2001 | Seigel et al. | |
| 2002/0135536 A1 | 9/2002 | Bruning | |
| 2003/0065722 A1 | 4/2003 | Ieperen | |
| 2003/0070072 A1 | 4/2003 | Nassiri | |
| 2003/0236792 A1 | 12/2003 | Mangerie et al. | |
| 2004/0070616 A1 | 4/2004 | Hildebrandt et al. | |
| 2004/0199639 A1 | 10/2004 | Harris | |
| 2006/0053230 A1 | 3/2006 | Montero | |
| 2006/0285689 A1 | 12/2006 | Selve | |
| 2007/0245407 A1 | 10/2007 | Lester et al. | |
| 2008/0043100 A1 | 2/2008 | Sobel | |
| 2008/0089586 A1 | 4/2008 | Igarashi et al. | |
| 2009/0002346 A1 | 1/2009 | Henning et al. | |
| 2009/0019360 A1 | 1/2009 | Lynggaard et al. | |
| 2009/0021495 A1 | 1/2009 | Edgecomb et al. | |
| 2009/0063492 A1 | 3/2009 | Meyyappan et al. | |
| 2009/0073129 A1 | 3/2009 | Sirotich et al. | |
| 2009/0116703 A1 | 5/2009 | Schultz | |
| 2009/0146973 A1 | 6/2009 | Ung et al. | |
| 2009/0160818 A1 | 6/2009 | Wilde et al. | |
| 2009/0173856 A1 | 7/2009 | Auger et al. | |
| 2009/0173867 A1 | 7/2009 | Auger et al. | |
| 2009/0183228 A1 | 7/2009 | Dasch et al. | |
| 2009/0244278 A1 | 10/2009 | Taneja et al. | |
| 2009/0271848 A1 | 10/2009 | Leung et al. | |
| 2009/0309956 A1 | 12/2009 | Hawkins et al. | |
| 2009/0315861 A1 | 12/2009 | Zhang et al. | |
| 2010/0049626 A1 | 2/2010 | Hong et al. | |
| 2010/0073330 A1 | 3/2010 | Ericson et al. | |
| 2010/0149349 A1 | 6/2010 | Kroeker et al. | |
| 2010/0153160 A1 | 6/2010 | Bezemer et al. | |
| 2010/0178645 A1 | 7/2010 | Ieperen et al. | |
| 2010/0182285 A1 | 7/2010 | Tremblay | |
| 2010/0188478 A1 | 7/2010 | Robinson et al. | |
| 2010/0194708 A1 | 8/2010 | Popovich | |
| 2010/0281287 A1 | 11/2010 | Doerksen et al. | |
| 2010/0289776 A1 | 11/2010 | Bryborn Krus et al. | |
| 2010/0293605 A1 | 11/2010 | Longobardi | |
| 2010/0315413 A1 | 12/2010 | Izadi et al. | |
| 2010/0315994 A1 | 12/2010 | Lam | |
| 2011/0013001 A1 | 1/2011 | Craven-Bartle et al. | |
| 2011/0109554 A1 | 5/2011 | Boissier | |
| 2011/0181520 A1 | 7/2011 | Boda et al. | |
| 2011/0234746 A1 | 9/2011 | Saleh et al. | |
| 2011/0320961 A1 | 12/2011 | Sriraghavan et al. | |
| 2012/0030756 A1 | 2/2012 | Todd | |
| 2012/0110007 A1 | 5/2012 | Cohen et al. | |
| 2012/0229425 A1 | 9/2012 | Barrus et al. | |
| 2012/0229589 A1 * | 9/2012 | Barrus | 348/14.08 |
| 2012/0229590 A1 * | 9/2012 | Barrus | 348/14.08 |
| 2012/0233553 A1 * | 9/2012 | Barrus | 715/751 |
| 2012/0233615 A1 | 9/2012 | Barrus | |
| 2012/0274584 A1 * | 11/2012 | Schweikart | 345/173 |
| 2012/0278388 A1 * | 11/2012 | Kleinbart et al. | 709/204 |
| 2012/0280948 A1 * | 11/2012 | Barrus et al. | 345/179 |
| 2012/0281092 A1 * | 11/2012 | Olivier et al. | 348/148 |

OTHER PUBLICATIONS

Lee, Low-Cost Multi-Point Interactive Whiteboard using the Wiimote, downloaded from internet http://www.youtube.com/watch?v=5s5EvhHy7eQ on Apr. 26, 2012, 2 pages.

Faces in Real-Life Images, downloaded from internet http://people.cs.umass.edu/~elm/realfaces/call.html on Apr. 26, 2012, 2 pages.

Face Recognition Homepage downloaded from internet http://www.face-rec.org/conferences/ on Apr. 26, 2012, 7 pages.

Sticky-Notes.net, downloaded from internet http://www.sticky-notes.net on Apr. 26, 2012, 3 pages.

Mistry, "Quickies, Intelligent Sticky Notes", MIT Media Lab, downloaded from internet http://pranavmistry.com/projects/quickies/ on Apr. 26, 2012, 4 pages.

Quickies: Sticky Notes of 21st Century, downloaded from internet http://www.youtube.com/watch?v=HQT5_4aVvHU on Apr. 26, 2012, 3 pages.

Post-It Digital Notes, downloaded from internet http://download.cnet.com?Post-it-Digital-Notes/3000-2351_4-10060027.html on Apr. 26, 2012, 7 pages.

Non-Final Office Action for U.S. Appl. No. 13/041,792 mailed Jun. 7, 2012, 17 pages.

Final Office Action for U.S. Appl. No. 13/041,792 mailed on Oct. 17, 2012, 18 pages.

Non-Final Office Action for U.S. Appl. No. 13/041,805 mailed on Oct. 30, 2012, 8 pages.

Non-Final Office Action for U.S. Appl. No. 13/102,963 mailed on Jan. 22, 2013, 8 pages.

Non-Final Office Action for U.S. Appl. No. 13/041,910 mailed on Jan. 24, 2013, 17 pages.

U.S. Appl. No. 13/041,769, filed Mar. 7, 2011 by John Barrus.
U.S. Appl. No. 13/041,792, filed Mar. 7, 2011 by John Barrus.
U.S. Appl. No. 13/041,805, filed Mar. 7, 2011 by John Barrus.
U.S. Appl. No. 13/041,910, filed Mar. 7, 2011 by John Barrus et al.
U.S. Appl. No. 13/102,963, filed May 6, 2011 by John Barrus et al.

"Hitachi to Bundle EverNote Software and Technologies With StarBoard Products", Ritescript Press Releases, Nov. 7, 2007, Evernote Corp., 2 pages.

Baker at el., "Computation and Performance Issues in Coliseum, An Immersive Videoconferencing System", Jul. 15, 2003, Mobile and Media Systems Laboratory, HP Laboratories, Palo Alto, USA, 18 pages.

Bezaitis, "New Technologies for Aging in Place", Aging Well, vol. 1 No. 2 p. 26, Spring 2008, Great Valley Publishing Co., Inc., Spring City, USA, 4 pages.

Cisco WebEx Meeting Center—Product Overview: Share ideas with anyone, anywhere—online, Copyright 2011, Cisco Systems, Inc., 2 pages.

Citrix Online, Product Overview|Web Conferencing, Product Overview|Web Conferencing, Collaboration Tools, Copyright 2011, Citrix Online, 4 pages.

CopyCam Installation and Operation Guide, Copyright 2009, Steelcase Corporation, 72 pages.

Dibbell, "Gestural Interfaces", Technology Review, May/Jun. 2011, MIT, 1 page.

Hitachi Digital Media, "Ultimate Short Throw LCD Projectors for Business and Education, Preliminary Specifications", Sep. 2010, downloaded from internet http://www.hitachiultimateprojector.com/docs/Ultimate_Short_Throw_Brochure_UK_prelim.pdf, 4 pages.

How Aviary Uses Evernote for WhiteBoard Sessions, Aviary.com, downloaded from internet http://www.youtube.com/watch?v=tmtHJ71JPrc on Apr. 2, 2012, 6 pages.

Ishii et al., "ClearBoard: A Seamless Medium for Shared Drawing and Conversation with Eye Contact", CHI '92, May 3-7, 1992, Association for Computing Machinery, 10 pages.

Ishii et al., "Iterative Design of Seamless Collaboration Media", vol. 37 No. 8, Aug. 1994, Communications of the ACM, Association for Computing Machinery, pp. 84-97, 15 pages.

(56) References Cited

OTHER PUBLICATIONS

Kunz et al., "CollaBoard: A Novel Interactive Electronic Whiteboard for Remote Collaboration with People on Content", 2010 International Conference on Cyberworlds, Copyright 2010 IEEE Computer Society, 8 pages.

Larkin, "Editorial Review of *BumpTop*", PCWorld.com, downloaded from internet http://www.pcworld.com/downloads/file/fid,77603/description.html on Sep. 15, 2011, 1 page.

Liao et al., "Robust and Accurate Visual Echo Cancelation in a Full-duplex Projector-camera System", Sep. 9, 2006, 17 pages.

LifeSize Desktop—Superior Standalone HD Desktop Client, Copyright 2010, LifeSize Communications, 2 pages.

Microsoft® Office Live Meeting Feature Guide, Jan. 2005, Microsoft Corporation, 17 pages.

MimioCapture Ink Recording System, Copyright 2011 DYMO Mimio, downloaded from internet http://www.mimio.dymo.com/en-US/Products/MimioCapture.aspx on Sep. 15, 2011, 1 page.

MimioClassroom Solution, Copyright 2011 DYMO Mimio, downloaded from internet http://www.mimio.dymo.com/en-US/Products/MimioClassroom-Family-of-Products.aspx on Sep. 15, 2011, 2 pages.

MimioPad Wireless Tablet, Copyright 2011 DYMO Mimio, downloaded from internet http://www.mimio.dymo.com/en-US/Products/MimioPad-Wireless-Tablet.aspx on Sep. 15, 2011, 1 page.

MimioStudio 9 Software, Jan. 2012 Specifications Sheet, DYMO, 2 pages.

MimioStudio Interactive Software, Copyright 2011 DYMO Mimio, downloaded from internet http://www.mimio.dymo.com/en-US/Products/MimioStudio-Software.aspx on Sep. 15, 2011, 1 page.

MimioTeach Interactive System, Copyright 2011 DYMO Mimio, downloaded from internet http://www.mimio.dymo.com/en-US/Products/MimioTeach-Interactive-System.aspx on Sep. 15, 2011, 2 pages.

MimioTeach, Jan. 2012 Specifications Sheet, DYMO, 2 pages.

MimioView Document Camera, Copyright 2011 DYMO Mimio, downloaded from internet http://www.mimio.dymo.com/en-US/Products/MimioView-Document-Camera.aspx on Sep. 15, 2011, 1 page.

Mohan et al., "Bokode: Imperceptible Visual tags for Camera Based Interaction from a Distance", Camera Culture Group, MIT Media Lab, downloaded from internet http://cameraculture.media.mit.edu/bokode on Sep. 15, 2011, 12 pages.

Raskar et al., "The Office of the Future: A Unified Approach to Image-Based Modeling and Spatially Immersive Displays", Jul. 19-24, 1998, SIGGRAPH 98, Orlando, Florida, Computer Graphics Proceedings, Annual Conference Series, 10 pages.

Screen sharing, Skype, downloaded from internet http://www.skype.com/intl/en-us/features/allfeatures/screen-sharing/ on Jan. 18, 2012, 4 pages.

Scriblink, Copyright 2012 Scriblink LLC., downloaded from internet http://www.scriblink.com/index.jsp?act=about on Feb. 7, 2012, 1 page.

SMART Bridgit™ conferencing software, Copyright 2011, SMART Technologies, 2 pages.

SMART Notebook™ 10.8—Mac OS X operating system software User's guide, Copyright 2008-2011, SMART Technologies ULC., 134 pages.

Tan et al., "ConnectBoard: A remote collaboration system that supports gaze-aware interaction and sharing", MMSP 2009: IEEE International Workshop on Multimedia Signal Processing, Oct. 5-7, 2009, Rio de Janeiro, Brazil, Abstract downloaded from internet ieeexplore.ieee.org/xpl/freeabs_all.jsp?arnumber=5293268 on Feb. 7, 2012, 1 page.

Tan et al., "ConnectBoard: Enabling Genuine Eye Contact and Accurate Gaze in Remote Collaboration", IEEE Transactions on Multimedia, vol. 13, No. 3, Jun. 2011, pp. 466-473, 9 pages.

Tan et al., "Enabling Genuine Eye Contact and Accurate Gaze in Remote Collaboration", Presented at IEEE International Conference on Multimedia and Expo, Jul. 19, 2010, Mobile and Media Systems Laboratory, HP Laboratories, Palo Alto, USA, pp. 430-435, 7 pages.

Tang et al., "VideoArms: Embodiments for Mixed Presence Groupware", Sep. 11-15, 2006, Copyright 2006 ACM, London, UK, 16 pages.

VNC Enterprise Edition—Product Information: Overview, Copyright 2011, RealVNC Limited, 2 pages.

Wacom Components: Input Technology, Copyright 2007 Wacom, downloaded from internet http://www.wacom-components.com/english/technology/index.html on Sep. 15, 2011, 2 pages.

Wacom Components: Input Technology: EMR Technology, Copyright 2007 Wacom, downloaded from internet http://www.wacom-components.com/english/technology/emr.html on Sep. 15, 2011, 4 pages.

Wacom Components: Input Technology: Features and Advantages of EMR Technology, Copyright 2007 Wacom, downloaded from internet http://www.wacom-components.com/english/technology/feature.html on Sep. 15, 2011, 2 pages.

Wacom Components: Input Technology: Mobile Equipment, Copyright 2007 Wacom, downloaded from internet http://www.wacom-components.com/english/technology/mobile.html on Sep. 15, 2011, 3 pages.

Wacom Components: Input Technology: Penabled Technology, Copyright 2007 Wacom, downloaded from internet http://www.wacom-components.com/english/technology/penabled.html on Sep. 15, 2011, 1 page.

Wacom Components: Input Technology: Touch Technology, Copyright 2007 Wacom, downloaded from internet http://www.wacom-components.com/english/technology/touch.html on Sep. 15, 2011, 3 pages.

Wilson et al., "Combining Multiple Depth Cameras and Projectors for Interactions On, Above, and Between Surfaces", Oct. 3-6, 2010, UIST '10, ACM, New York, USA, 10 pages.

Final Office Action for U.S. Appl. No. 13/041,910 mailed on Jun. 20, 2013, 20 pages.

Apperley et al., "Use of Video Shadow for Small Group Interaction Awareness on a Large Interactive Display Surface", The Computer Science Department University of Waikato, Hamilton, New Zealand, 2002, 10 pages.

Final Office Action for U.S. Appl. No. 13/041,805 mailed on Mar. 1, 2013, 10 pages.

Extended European Search Report for European Application No. 12156226.8 dated May 9, 2012, 5 pages.

Final Office Action for U.S. Appl. No. 13/041,769 mailed on Mar. 5, 2013, 23 pages.

Non-Final Office Action for U.S. Appl. No. 13/041,769 mailed Aug. 31, 2012, 23 pages.

Non-Final Office Action for U.S. Appl. No. 13/041,792 mailed on Dec. 5, 2013, 21 pages.

Notice of Allowance for U.S. Appl. No. 13/041,769 mailed on Dec. 11, 2013, 1 page.

Office Action in related Japanese Application No. 2012-047976 dated Nov. 19, 2013, 3 pages.

Advisory Action for U.S. Appl. No. 13/102,963 mailed on Jan. 14, 2014, 3 pages.

* cited by examiner

VIDEO CONFERENCING WITH SHARED DRAWING

BACKGROUND

Embodiments of the present invention relate in general to electronic collaboration, and in particular to techniques for enabling video conferencing with interactive sharing of drawings and/or other information.

Video conferencing is widely used to facilitate "face-to-face" video/audio communication between parties located at two or more remote locations. One limitation with conventional video conferencing systems is that they typically do not allow the conference participants to share drawings in an interactive manner. For example, if a first participant wishes to share a drawing with a second, remote participant, the first participant is generally limited to pointing the video camera on his/her side to the medium on which the drawing is drawn (e.g., a piece of paper or a whiteboard), hoping that the second participant can see it clearly via the video feed. In this example, the second participant cannot interactively mark up or otherwise make changes to the drawing.

It is possible to use conventional interactive whiteboard (IWB) systems in parallel with conventional video conferencing systems to enable shared drawing capability during a video conference. For instance, a first IWB system located at a first site of a video conference can be connected to a second IWB system located at a second site of the video conference. The first IWB system can capture a drawing made by a user at the first site and convert the drawing into digital form. The digitized representation of the drawing can then be displayed at both the first IWB system and the second IWB system, thereby allowing the drawing to be manipulated by users at both the first and second sites.

However, setting up and operating separate IWB and video conferencing systems in this manner can be a complex and time-consuming endeavor. For example, each system generally requires separate calibration, connection management, and other setup tasks. In addition, using separate IWB and video conferencing systems generally requires multiple displays, input devices, and other components, thereby increasing costs, space requirements, and cognitive load on users who must learn and maintain each system.

BRIEF SUMMARY

Embodiments of the present invention provide techniques for enabling video conferencing with interactive sharing of drawings and/or other information. In one set of embodiments, a system is provided that includes a drawing surface, a video camera embedded or integrated into the drawing surface, and a front projector. The drawing surface can capture drawings made on the surface by a user, and the video camera can capture a video stream of the user. The system can send digital information representing the captured drawings and the video stream to a remote system. The system can also receive digital information representing drawings made by a remote user and a video stream of the remote user from the remote system. The front projector can project a video signal onto the drawing surface that incorporates the captured drawings, the drawings made by the remote user, and the video stream of the remote user.

In certain embodiments, the front projector can be positioned and/or configured such that the light cast by the projector onto the drawing surface does not substantially interfere with the video capture performed by the embedded video camera. In a particular embodiment, the front projector can be an ultra-short-throw (UST) projector.

According to one embodiment of the present invention, a collaborative system is provided that includes a drawing surface configured to capture drawings made on the drawing surface by a first user; a video camera embedded in the drawing surface, the video camera configured to capture a first video stream of the first user; and a controller. The controller is configured to generate, based on information received from the drawing surface, first digital information representing the captured drawings; transmit, to a remote collaborative system, the first digital information and the first video stream; and receive, from the remote collaborative system, a second video stream of a second user. The system further includes a projector positioned in front of the drawing surface, where the projector is configured to project onto the drawing surface a video signal including the captured drawings and the second video stream.

In one embodiment, the projector has a throw ratio of less than 0.4.

In one embodiment, the projector is positioned within 60 inches of the drawing surface.

In one embodiment, the video camera is inset from a front plane of the drawing surface by less than 0.5 inches.

In one embodiment, when projecting images onto to the drawing surface, the projector does not cast a substantial amount of light into the lens of the video camera.

In one embodiment, the controller is further configured to generate the video signal projected onto the drawing surface based on the first digital information and the first video stream.

In one embodiment, the controller is further configured to receive, from the remote collaborative system, second digital information representing drawings captured by the remote collaborative system.

In one embodiment, the controller is further configured to generate an updated video signal for projection onto the drawing surface based on the first digital information, the second video stream, and the second digital information, such that the updated video signal includes the drawings captured by the drawing surface, the second video stream, and the drawings captured by the remote collaborative system.

In one embodiment, the captured drawings are laid over the second video stream in the video signal.

In one embodiment, the second video stream is mirrored prior to being included in the video signal.

In one embodiment, the drawing surface is greater than 36 inches in width and greater than 24 inches in height.

In one embodiment, the drawing surface is less than 6 inches in depth.

In one embodiment, the drawing surface is configured to capture the drawings using one or more pressure or touch sensors.

In one embodiment, the collaborative system further includes a microphone configured to capture an audio stream within a vicinity of the collaborative system.

In one embodiment, the microphone is embedded in the drawing surface.

In one embodiment, the controller is further configured to transmit the audio stream to the remote collaborative system.

According to another embodiment of the present invention, a method is provided that includes receiving, by a computer system, information captured in response to drawings made by a first user on a drawing surface; generating, by the computer system based on the received information, first digital information representing the drawings made by the first user; and receiving, by the computer system, a first video stream captured by a video camera embedded in the drawing surface. The method further includes transmitting, by the computer system, the first video stream and the first digital information to a remote system; receiving, by the computer system from the remote system, a second video stream captured by the remote; and generating, by the computer system, a video signal based on the first digital information and the second video stream, such that the video signal includes the drawings made by the first user and the second video stream, where the video signal is projected onto the drawing surface using a front projector.

In one embodiment, the method further includes receiving, by the computer system from the remote system, second digital information representing drawings made by a second user of the remote system; and generating, by the computer system, an updated video signal based on the first digital information, the second video stream, and the second digital information, such that the updated video signal includes the drawings made by the first user, the second video stream, and the drawings made by the second user, where the updated video signal is projected onto the drawing surface using the front projector.

According to another embodiment of the present invention, a non-transitory computer-readable storage medium having stored thereon program code executable by a processor is provided. The program code includes code that causes the processor to receive information captured in response to drawings made by a first user on a drawing surface; code that causes the processor to generate, based on the received information, first digital information representing the drawings made by the first user; and code that causes the processor to receive a first video stream captured by a video camera embedded in the drawing surface. The program code further includes code that causes the processor to transmit the first video stream and the first digital information to a remote system; code that causes the processor to receive, from the remote system, a second video stream captured by the remote; and code that causes the processor to generate a video signal based on the first electronic information and the second video stream, such that the video signal includes the drawings made by the first user and the second video stream, where the video signal is projected onto the drawing surface using a front projector.

In one embodiment, the program code further includes code that causes the processor to receive, from the remote system, second digital information representing drawings made by a second user of the remote system; and code that causes the processor to generate an updated video signal based on the first digital information, the second video stream, and the second digital information, such that the updated video signal includes the drawings made by the first user, the second video stream, and the drawings made by the second user, where the updated video signal is projected onto the drawing surface using the front projector.

The foregoing, together with other features and embodiments, will become more apparent when referring to the following specification, claims, and accompanying drawings.

DETAILED DESCRIPTION

Figure 1:
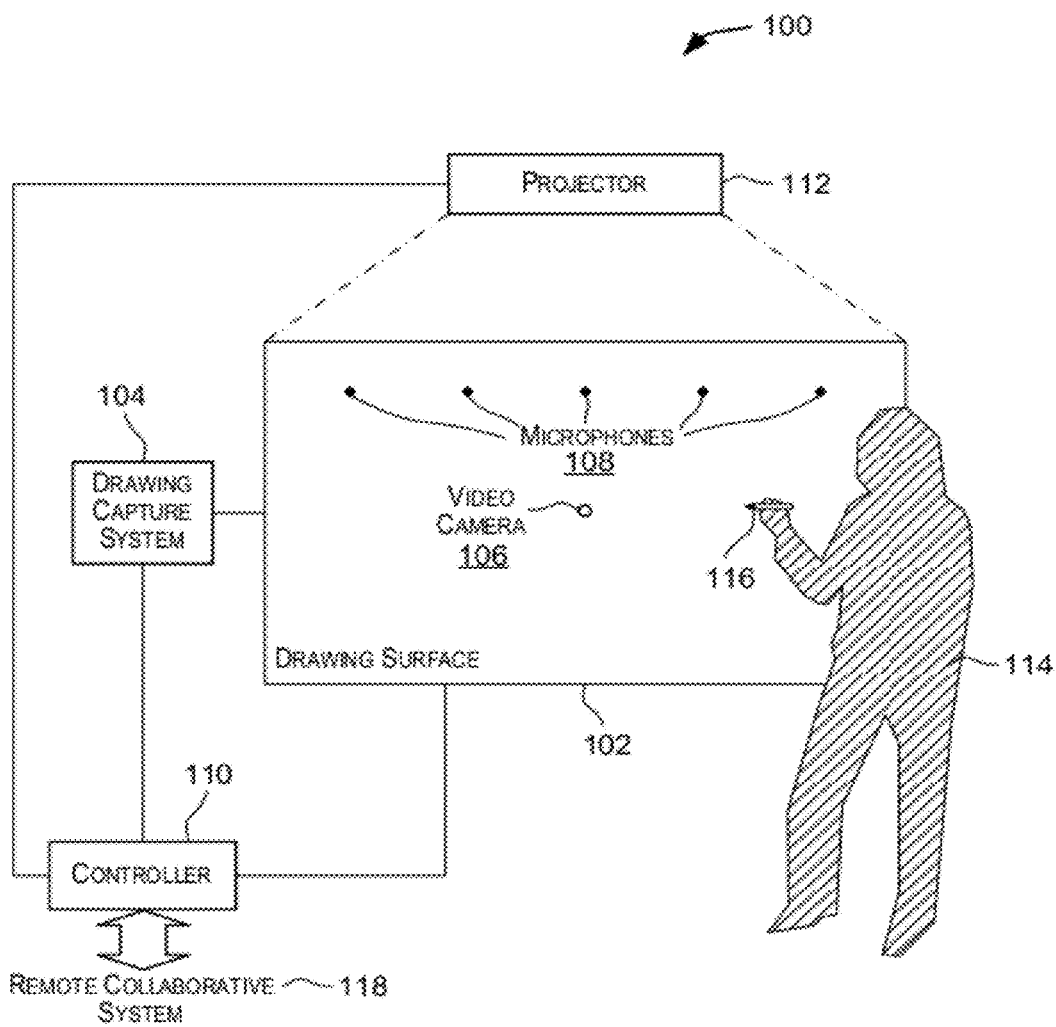
FIG. 1 is a simplified block diagram of a collaborative system in accordance with an embodiment of the present invention.

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for enabling video conferencing with interactive sharing of drawings and/or other information. In one set of embodiments, a system is provided that includes a drawing surface, a video camera embedded or integrated into the drawing surface, and a front projector. The drawing surface can capture drawings made on the surface by a user, and the video camera can capture a video stream of the user. The system can send digital information representing the captured drawings and the video stream to a remote system. The system can also receive digital information representing drawings made by a remote user and a video stream of the remote user from the remote system. The front projector can project a video signal onto the drawing surface that incorporates the captured drawings, the drawings made by the remote user, and the video stream of the remote user.

In certain embodiments, the front projector can be positioned and/or configured such that the light cast by the projector onto the drawing surface does not substantially interfere with the video capture performed by the embedded video camera. In a particular embodiment, the front projector can be an ultra-short-throw (UST) projector.

FIG. 1 is a simplified block diagram of a collaborative system 100 according to an embodiment of the present invention. As shown, collaborative system 100 can include a drawing surface 102, a drawing capture system 104, a video camera 106, microphones 108, a controller 110, and a projector 112.

Drawing surface 102 can act as both an input and output interface for collaborative system 100. As an input interface, drawing surface 102 can receive drawings made by a user (e.g., user 114) and, in conjunction with drawing capture system 104, capture those drawings in electronic form. As an output interface, drawing surface 102 can display a video signal that includes the captured drawings and information received from a remote collaborative system (e.g., system 118). In one set of embodiments, the video signal can be projected onto drawing surface 102 by a front projector, such as projector 112.

For the purposes of the present disclosure, the term "drawing" can refer to any kind of information that is drawn or written by hand. As one example, a drawing can be a hand-drawn figure, sketch, or illustration. As another example, a drawing can include hand-written letters, numbers, or symbols, expressed in any language or format. As yet another example, a drawing can comprise a combination of hand-drawn pictorial and textual elements.

Drawing surface 102 can be implemented using any type of surface, board, screen, or other physical medium that can be drawn on by a user and can display information projected onto the surface. In some embodiments, drawing surface 102 can have dimensions that are similar to a conventional whiteboard or interactive whiteboard. For example, in a particular embodiment, drawing surface 102 can be at least 36 inches in width and at least 24 inches in height. In certain embodiments, drawing surface 102 can have an aspect ratio of 4:3, 16:9, or 16:10, which are industry standard aspect ratios for TV, HDTV, and WXGA. In further embodiments, drawing surface 102 can have a depth that makes it capable of being mounted on a wall or other vertical surface. For example, in a particular embodiment, drawing surface 102 can have a depth of less than 6 inches.

In one set of embodiments, user 114 can draw on drawing surface 102 using one or more writing instruments, such as writing instrument 116. Generally speaking, writing instrument 116 can be any type of physical object usable for defining strokes on drawing surface 102. In certain embodiments, writing instrument 116 can be an instrument that does not leave any visible marks when used on drawing surface 102, such as user 114's finger, or an electronic pointer or stylus. In other embodiments, writing instrument can be an instrument designed to leave visible marks, such as a pen or a conventional dry erase marker. In one embodiment, the drawing surface 102 can be capable of sensing multiple touches simultaneously allowing a user to make multiple marks at the same time.

Regardless of the nature of writing instrument 116, the drawings made by user 114 with writing instrument 116 on drawing surface 102 can be captured electronically by drawing capture system 104. In particular, drawing capture system 104 can include one or more sensors and/or other components that enable the system to detect when user 114 places writing instrument 116 in contact with (or substantially close to) drawing surface 102 and moves instrument 116 across the surface for the purpose of drawing or writing.

In one set of embodiments, drawing capture system 104 can be an integral part of drawing surface 102. For example, drawing capture system 104 can comprise touch or multi-touch sensors (e.g., capacitive, resistive, pressure-sensitive, etc.) that are embedded in drawing surface 102. These embedded sensors can detect when writing instrument 116 has been placed against drawing surface 102 and can generate a stream of sensor data indicating the movement of instrument 116 over the surface. In these embodiments, the touch or multi-touch sensors can also detect the force with which user 114 draws upon surface 102, e.g. by the amount of pressure detected or by the area of the writing instrument that makes contact with the surface.

In an alternative set of embodiments, drawing capture system 104 can be physically separate from drawing surface 102. For example, drawing capture system 104 can comprise one or more cameras that are positioned in front of drawing surface 102 and are configured to capture images of any visible marks made on surface 102 using writing instrument 116. As another example, drawing capture system 104 can comprise one or more sensors that are external to drawing surface 102 and are configured to capture the motion of writing instrument 116 (in either two or three dimensions) when used by user 114 to draw on surface 102. In these embodiments, drawing surface 102 can be, e.g., a conventional whiteboard surface.

In some embodiments, drawing capture system 104 can be communicatively linked with writing instrument 116 to facilitate drawing capture. This link can be a wired or wireless (e.g., infrared (IR), radio-frequency (RF), electromagnetic, etc.) link.

Video camera 106 can be a conventional or specialized video capture device that is embedded in drawing surface 102 and is configured to capture video of an area in front of surface 102. In one set of embodiments, video camera 106 can be designed to have a relatively small front lens element, such that the opening needed in drawing surface 102 to accommodate the camera does not exceed a threshold size. For example, video camera 106 can have a front lens element with a diameter less than $3/8$ inches.

In certain embodiments, video camera 106 can capture a video stream of user 114 that includes a frontal view of user 114 when he/she is facing drawing surface 102. As described in further detail below, this video stream can be transmitted to remote collaborative system 118, thereby enabling users of system 118 to engage in a "face-to-face" video conference with user 114.

In a particular embodiment, video camera 106 can be slightly inset from the front plane of drawing surface 102 to avoid glare and to prevent stray light (e.g., light from projector 112) from interfering with the video capture performed by camera 106. For example, video camera 106 can be inset from the front plane of drawing surface 102 by less than $1/2$ inch.

In parallel with the video capture performed by video camera 106, microphones 108 can capture audio information within a vicinity of drawing surface 102. For example, microphones 108 can be configured to capture a stream of audio comprising words spoken by user 114 while he/she is positioned in front of drawing surface 102. In certain embodiments, this audio stream can be synchronized with the video stream captured by video camera 106 and transmitted, along with the video stream, to remote collaboration system 118 during a video conferencing session. Although microphones 108 are shown in FIG. 1 as being embedded in drawing surface 102, in some embodiments microphones 108 can be separate from surface 102. Further, although microphones 108 are shown in FIG. 1 as being distinct from video camera 106, in some embodiments microphones 108 can be integrated into camera 106.

Controller 110 can act as a central processing component for coordinating the various components of collaborative system 100 and for enabling the collaborative functions provided by system 100. In one set of embodiments, controller 110 can be implemented using a computer system such as system 600 described with respect to FIG. 6 below. In alternative embodiments, controller 110 can be implemented using a processor, a programmable logic device, or the like.

As shown in FIG. 1, controller 110 can be communicatively coupled with drawing surface 102, drawing capture system 104, projector 112, and remote collaborative system 118. In one set of embodiments, controller 110 can receive information from drawing capture system 104 corresponding to one or more drawings captured from drawing surface 102. Controller 110 can then process the received information to determine digital information representing the captured drawings. For example, the information received from drawing capture system 104 can comprise a raw stream of sensor data, such as pressure readings, two (or three) dimensional coordinates, or the like. Controller 110 can process the raw sensor data to generate a high-level digital representation of the captured drawings, such as a time-ordered series of strokes, a pixel-based image, or plain or formatted text.

Concurrently with receiving information from drawing capture system 104, controller 110 can receive information from remote collaborative system 118 representing drawing information and/or video/audio information captured at system 118. For example, in one set of embodiments, remote collaborative system 118 can be substantially similar in configuration to collaborative system 100, with a remote drawing surface, a remote drawing capture system, a remote video camera, remote microphones, a remote controller, and the like. In these embodiments, controller 110 can receive from remote collaborative system 118 digital information representing drawings made by a remote user on the remote drawing surface (and captured via the remote drawing system), and/or video/audio streams (e.g., of the remote user) captured by the remote video camera and remote microphones.

Based on (1) the digital information representing drawings made by user 114 on drawing surface 102, (2) the digital information representing drawings made by the remote user on the remote drawing surface, and (3) the video stream captured by the remote video camera, controller 110 can generate a video signal for projection onto drawing surface 102 (via, e.g., projector 112) that incorporates (1), (2), and (3). In this manner, user 114 can simultaneously view on drawing surface 102 the drawings made locally and remotely, as well as a "face-to-face" video feed of the remote user at remote collaborative system 118. In one set of embodiments, user 114 can interact with the projected drawings by making further drawings or strokes on drawing surface 102 with writing instrument 116 (or another instrument, such as an erasing instrument). The further drawings or strokes can be captured by drawing capture system 104 and processed by controller 110 to update the projected video signal.

It should be noted that, in some cases, controller 110 may not have any information regarding drawings made on drawing surface 102 or drawings made on the remote drawing surface of system 118 at the time of generating the video signal. This can occur, for example, if user 114 has not yet drawn on drawing surface 102 and the remote user at system 118 has not yet drawn on the remote drawing surface. In these situations, the generated video signal can simply include the video stream of the remote user at remote collaborative system 118 (or an image of, e.g., a document or some other piece of shared information as discussed with respect to FIG. 5 below).

In parallel with generating the video signal described above for projection onto local drawing surface 102, controller 110 can send information to remote collaborative system 118 for enabling projection of a corresponding video signal onto the remote drawing surface of system 118. For example, controller 110 can receive from drawing surface 102 video/audio streams of user 114 captured by video camera 106 and microphones 108. Controller 110 can then send these video/audio streams, along with the digital information representing drawings made by user 114 on drawing surface 102 (if available), to remote collaborative system 118. At system 118, the remote controller can construct an appropriate video signal based on this information for projection onto the remote drawing surface. The remote user at system 118 can then view/interact with the projected video in a similar manner as described for user 114.

Projector 112 can be any type of device capable of projecting a video signal or image onto a surface while being positioned in front of the surface (e.g., a front projector). As described above, in one set of embodiments projector 112 can receive a video signal from controller 110 that includes drawings made locally by user 114, drawings made remotely at remote collaborative system 118, and/or a video stream captured remotely at remote collaborative system 118. Projector 112 can then project the video signal onto drawing surface 102. In a particular embodiment, projector 112 can project the video signal such that the projected representation of a particular drawing made on drawing surface 102 appears at the same place on surface 102 that it was originally drawn. In a further embodiment, projector 112 can project the video signal such that the projected representation of a particular drawing made on the remote drawing surface of system 118 appears on drawing surface 102 at the same place it was originally drawn on the remote drawing surface.

In one set of embodiments, projector 112 can be configured and/or positioned such that the light cast by the projector onto drawing surface 102 does not substantially interfere with the video capture performed by video camera 106. In one embodiment, projector 112 can be an ultra-short-throw (UST) front projector that has a throw ratio (defined as the distance of the projector lens to drawing surface 102 divided by the width of the projected image) of less than 0.4. An example of such a projector is the CP-AW250NM produced by Hitachi, Ltd. In another embodiment, projector 112 can be positioned within 60 inches of the front plane of drawing surface 102.

It should be appreciated that FIG. 1 is illustrative and not intended to limit embodiments of the present invention. For example, system 100 can have other capabilities or have more or fewer components than those depicted in FIG. 1. One of ordinary skill in the art will recognize other variations, modifications, and alternatives.

Figure 2:
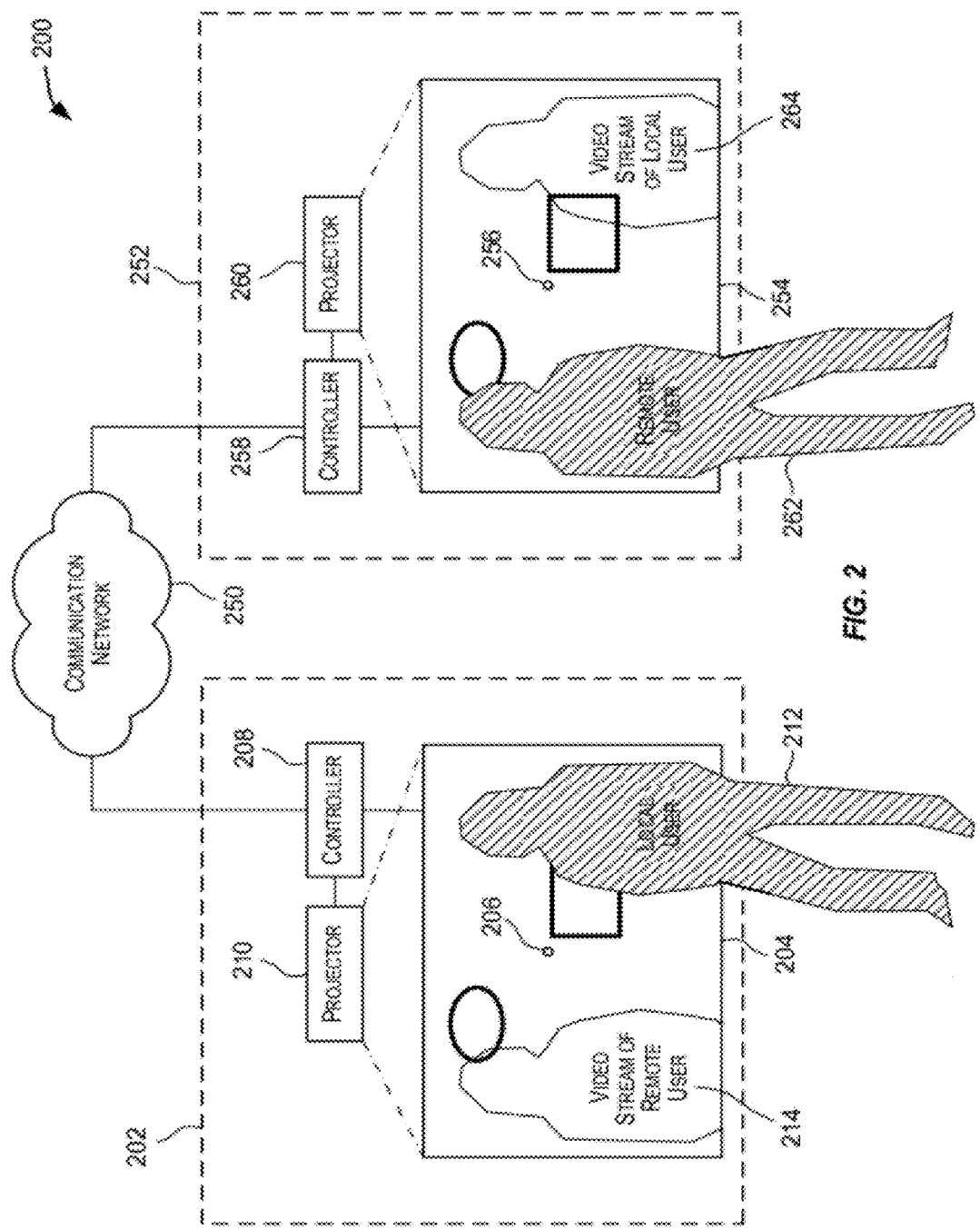
FIG. 2 is a simplified block diagram of an environment in which multiple collaborative systems can be networked in accordance with an embodiment of the present invention.

FIG. 2 is a simplified block diagram of an environment 200 in which multiple collaborative systems can be networked according to an embodiment of the present invention. FIG. 2 is provided to illustrate one exemplary flow of how the users of these networked systems can engage in a face-to-face video conference while interactively sharing drawings and/or other information.

As shown, environment 200 can include a local collaborative system 202 communicatively coupled with a remote collaborative system 252 via a communication network 250. Local collaborative system 202 and remote collaborative system 252 can each be substantially similar in configuration to collaborative system 100 of FIG. 1. For example, systems 202 and 252 can each include respective drawing surfaces (204, 254), video cameras (206, 256), controllers (208, 258), and projectors (210, 260). Systems 202 and 252 can also include other components that are described with respect to collaborative system 100 of FIG. 1. For instance, although not depicted, drawing surfaces 204 and 254 of systems 202 and 252 can each incorporate a drawing capture system and microphones that are similar to drawing capture system 104 and microphones 108 of system 100.

Communication network 250 can be any type of network that enables data communication, such as a local area network (LAN), a wide-area network (WAN), a virtual network (e.g., VPN), a metro-area network (MAN), or the Internet. In certain embodiments, communication network 250 can comprise a collection of interconnected networks.

In one set of embodiments, a local user 212 operating local collaborative system 202 can establish a connection between system 202 and remote collaborative system 252 for the purpose of engaging in an interactive video conference with remote user 262. This setup task can be carried out by local user 212 via a user interface projected onto local drawing surface 204 via local projector 210 (UI not shown), where the user interface can include, e.g., a UI element for selecting or entering an IP address or name of remote collaborative system 252.

Once the connection has been established, local video camera 206 of local collaborative system 202 can begin capturing video and audio streams of local user 212 and can send the video/audio streams to local controller 208. Local controller 208 can then begin transmitting these video/audio streams to remote controller 258 of remote collaborative system 252. At the same time, remote video camera 256 of remote collaborative system 252 can being capturing video and audio streams of remote user 262 and can send the video/audio streams to remote controller 258. Remote controller 258 can then begin transmitting these video/audio streams to local controller 208 of local collaborative system 202.

Upon receiving the video/audio streams from remote controller 258, local controller 208 can generate a video signal including the received video stream for projection onto local drawing surface 204 via local projector 210. Similarly, upon receiving the video/audio streams from local controller 208, remote controller 258 can generate a video signal including the received video stream for projection onto remote drawing surface 254 via remote projector 260. In this manner, local user 212 and remote user 262 can view each other via their respective drawing surfaces and can engage in a video conference.

Since local video camera 206 is designed to face outward from the front plane of local drawing surface 204 (and since local user 212 will likely be facing surface 204), the video stream of local user 212 projected onto remote drawing surface 254 (i.e., video stream 264) can present a frontal view of local user 212. Similarly, since remote video camera 256 is designed to face outward from the front plane of remote drawing surface 254 (and since remote user 262 will likely be facing surface 254), the video stream of remote user 262 projected onto local drawing surface 204 (i.e., video stream 214) can present a frontal view of remote user 262. Thus, local user 212 and remote user 262 can have the impression of engaging in a face-to-face communication. In FIG. 2, streams 214 and 264 are depicted using simple line art; however, in actual operation, streams 214 and 264 can comprise standard or high resolution video images.

In certain embodiments, the video streams of local user 212 and remote user 262 can be mirrored prior to being projected onto remote drawing surface 254 and local drawing surface 204 respectively. This can ensure that any gestures made by one user with respect to his/her drawing surface appear to be oriented correctly to the other user. For example, if local user 212 points to a location on the right hand side of local drawing surface 204, that gesture will be horizontally flipped (i.e., appear to point to the left hand side) when captured by local video camera 206. Thus, the video stream of local user 212 needs to be mirrored so that local user 212 appears to be pointing to the right hand side of remote drawing surface 254 when viewed by remote user 262. In various embodiments, this mirroring can be performed by the controller transmitting the video stream or the controller receiving the video stream.

At some point during the video conferencing session, local user 212 and/or remote user 262 can begin drawing (using a writing instrument such as 116 of FIG. 1) on his/her respective drawing surface. For example, assume local user 212 draws a rectangle on local drawing surface 204. In response, local drawing surface 204 can capture the drawing of the rectangle and send drawing capture information to local controller 208. Local controller 208 can then determine, based on the drawing capture information, digital information representing the rectangle (e.g., a stroke-based or pixel based representation). Local controller 208 can further generate, based on the digital information and video stream 214, an updated video signal that includes the rectangle and the video stream, and can transmit the updated video signal to local projector 210 for projection onto local drawing surface 204.

At the same time, local controller 208 can transmit the digital information representing the rectangle to remote controller 258, which can generate, based on the digital information and video stream 264, an updated video signal that includes the rectangle and the video stream, and can transmit the updated video signal to remote projector 260 for projection onto remote drawing surface 254.

In this manner, the drawings made by local user 212 (i.e., the rectangle) can be displayed in electronic form at both the local and remote drawing surfaces. In essence, this provides an environment in which local user 212 and remote user 262 have the impression of sharing a single drawing surface.

As a further example, assume that remote user 262 subsequently draws an ellipse on remote drawing surface 254. In response, remote drawing surface 254 can capture the drawing of the ellipse and send drawing capture information to remote controller 258. Remote controller 258 can then determine, based on the drawing capture information, digital information representing the ellipse. Remote controller 258 can further generate, based on the digital information representing the ellipse, the digital information representing the rectangle, and video stream 214, an updated video signal that includes the ellipse, the rectangle, and the video stream, and can transmit the updated video signal to remote projector 260 for projection onto remote drawing surface 204.

At the same time, remote controller 258 can transmit the digital information representing the ellipse to local controller 208, which can generate, based on the digital information representing the ellipse, the digital information representing the rectangle, and video stream 264, an updated video signal that includes the ellipse, the rectangle, and the video stream, and can transmit the updated video signal to local projector 210 for projection onto local drawing surface 204.

Thus, like the rectangle drawn by local user 212, the ellipse drawn by remote user 262 can be displayed in electronic form at both the local and remote drawing surfaces. In one set of embodiments, these drawings can be laid over video streams 214 and 264 when displayed on drawing surfaces 204 and 254 respectively (as shown in FIG. 2). In other embodiments, the relative positioning of drawings and video streams 214/264 can differ based on one or more factors (discussed in greater detail with respect to FIGS. 4 and 5 below).

Subsequent to the flow described above, local user 212 and remote user 262 can interact further by making additional drawings or strokes on their respective drawing surfaces. These additional drawings or strokes can be captured and displayed on both sides. This interaction can continue indefinitely until either the local user or the remote user ends the session.

It should be appreciated that FIG. 2 is illustrative and not intended to limit embodiments of the present invention. For example, although only two collaborative systems are shown in FIG. 2, any number of such systems can be networked together and can be participants in an interactive video conference session. Further, the flow described with respect to FIG. 2 can be modified in various ways. For example, in certain embodiments remote user 262 can begin drawing prior to local user 212, or the two users can draw on their respective drawing surfaces at substantially the same time. Regardless of the sequencing, the drawings made by one user can be viewed and manipulated on both the local and remote sides.

Figure 3:
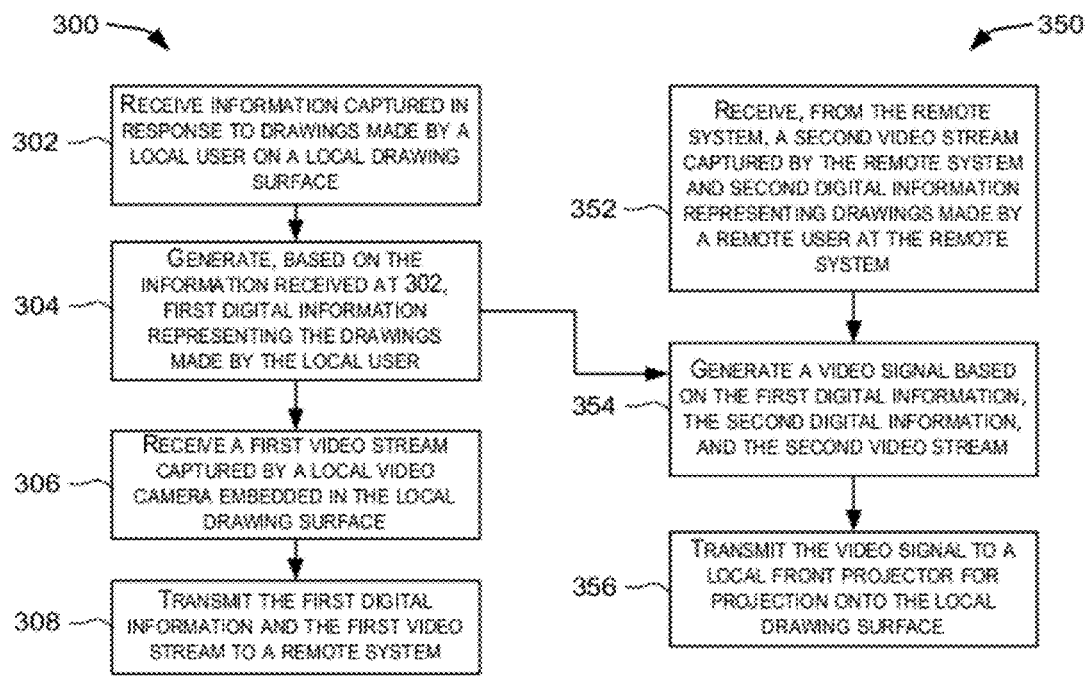
FIG. 3 is a flow diagram of processes that can be performed by a collaborative system in accordance with an embodiment of the present invention.

FIG. 3 is a flow diagram of parallel processes 300 and 350 that can be performed by local collaborative system 202 of FIG. 2 when participating in an interactive video conferencing session with remote collaborative system 252 according to an embodiment of the present invention. In particular, processes 300 and 350 can be carried out by local controller 208 of system 202. Processes 300 and 350 can be implemented in hardware, software, or a combination thereof. As software, processes 300 and 350 can be encoded as program code stored on a computer-readable storage medium.

At block 302, local controller 208 of local collaborative system 202 can receive information captured in response to drawings made by local user 212 on local drawing surface 204. This information can be in the form of, e.g., sensor readings captured by one or more sensors embedded in surface 204.

At block 304, local controller 208 can generate, based on the information received at 302, first digital information representing the captured drawings. For example, the first digital information can correspond to a time-ordered series of strokes, a pixel-based image, plain text or formatted text, or the like. In certain embodiments, the information received at block 302 may already formatted in a manner that does not require any further processing by local controller 208. In these embodiments, block 304 can be omitted.

At the same time as receiving drawing capture information, local controller 208 can receive a first video stream being captured by local video camera 206 embedded in local drawing surface 204 (block 306). This first video stream can include, for example, a frontal view of local user 212 as he is standing (or sitting) in front of surface 204. Although not shown in FIG. 3, local controller 208 can also receive an audio stream simultaneously with the first video stream. The audio stream can include, for example, words spoken by local user 212 and/or other sounds in the vicinity of local drawing surface 204.

At block 308, local controller 208 can transmit the first digital information generated at block 304 and the first video stream received at block 306 to remote controller 258 of remote collaborative system 252. Remote controller 258 can then process the received information and generate an appropriate video signal for projection onto remote drawing surface 254 (via, e.g., remote projector 260).

In parallel process 350, local controller 208 can receive, from remote controller 258, a second video stream captured by remote video camera 256 and/or second digital information representing drawings made by remote user 262 on remote drawing surface 254 (block 352). At block 354, controller 208 can generate a video signal for projection onto local drawing surface 204 based on the first digital information generated at block 302 or 304, the second digital information, and the second video stream. If local controller 208 had previously generated such a video signal, the processing of block 354 can comprise generating an updated video signal.

Figure 4:
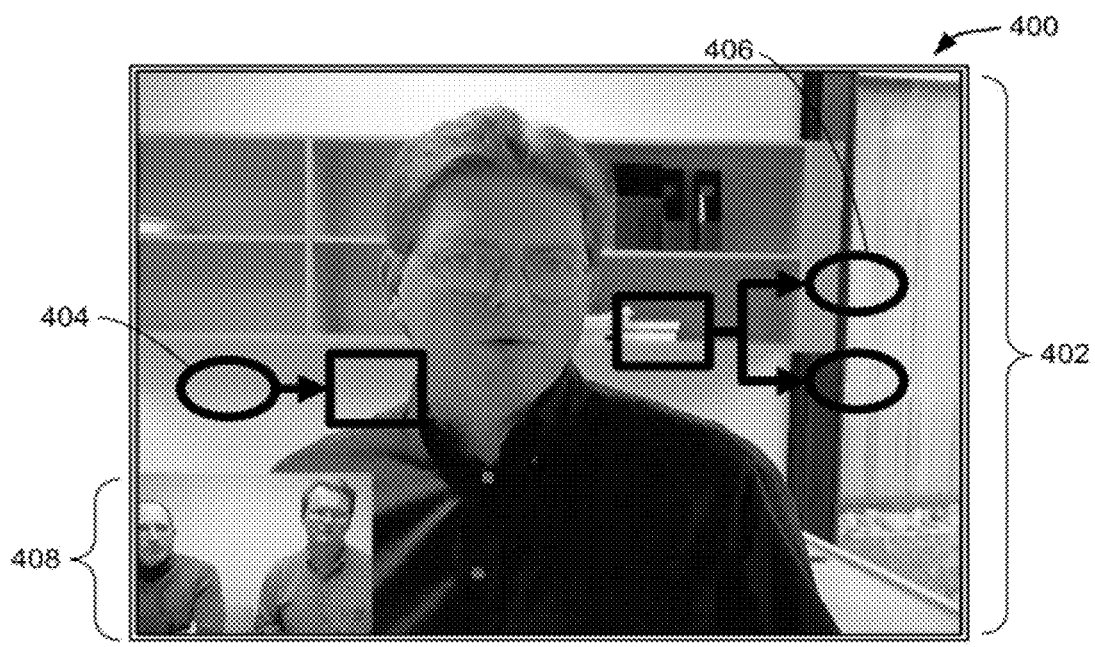
FIGS. 4 and 5 are simplified depictions of video signals that can be generated for projection onto a drawing surface in accordance with an embodiment of the present inventions.

Local controller 208 can then transmit the generated video signal to local front projector 210 for projection onto local drawing surface 204 (block 356). In various embodiments, the video signal can include the drawings made by local user 212, the drawings made by remote user 262, and the video stream captured by remote video camera 256 (of, e.g., remote user 262). In this manner, local user 212 can simultaneously view on surface 204 the drawings made locally and remotely, as well as a "face-to-face" video feed of remote user 262. In a particular embodiment, the video signal can also include the video stream being captured of local user 212 (as shown in FIG. 4 and described below). In this embodiment, the first video stream received by local controller 208 at block 306 can be used as an additional input for the video signal generation performed at block 354.

It should be appreciated that processes 300 and 350 are illustrative and that variations and modifications are possible. Steps described as sequential can be executed in parallel, order of steps can be varied, and steps can be modified, combined, added, or omitted. One of ordinary skill in the art would recognize other variations, modifications, and alternatives.

In one set of embodiments, the video signal generated at block 354 of FIG. 3 can be configured such that the drawings captured from local drawing surface 204 and remote drawing surface 254 are laid over the video stream received from remote collaborative system 252. FIG. 4 illustrates an example frame 400 from such a video signal. As shown, frame 400 includes a video stream 402 (e.g., of remote user 262) that encompasses nearly the entire height and width of the frame. Laid on top of video stream 402 are drawings 404 and 406 that represent drawings that have been made on both the local and remote sites. This type of configuration enables local user 212 to easily view the remote user and the drawings as a single composite image on local drawing surface 204. In one embodiment, video stream 400 can be made semi-transparent above a white background, thereby allowing drawings 404 and 406 to visually stand out against the video stream. In another embodiment, frame 400 can include a small window 408 for displaying the video stream being captured of local user 212.

Figure 5:
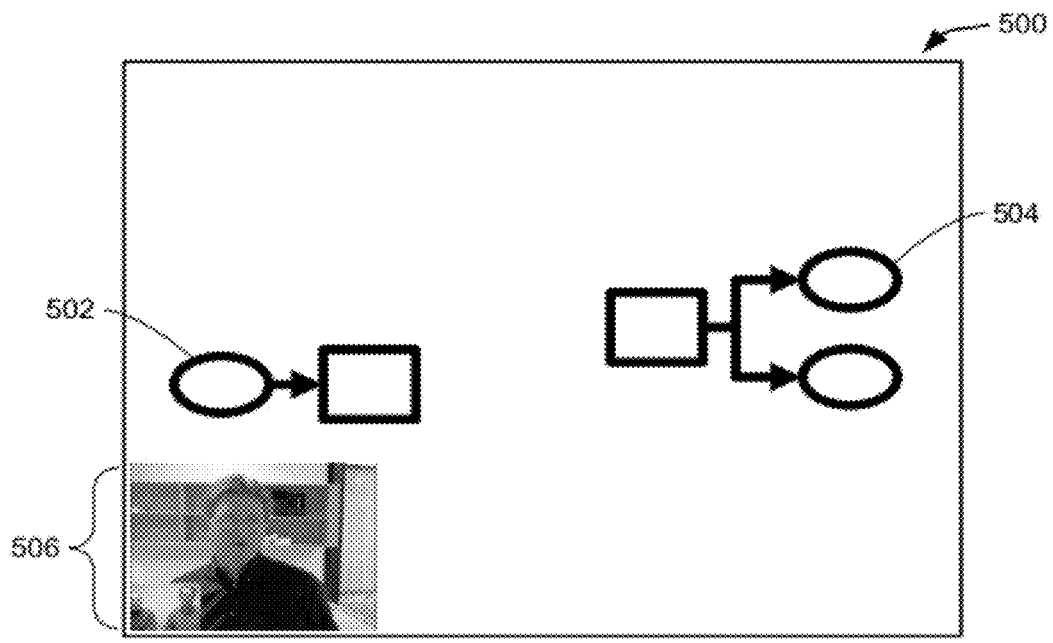

In alternative embodiments, the video signal generated at block 354 of FIG. 3 can be configured such that the drawings captured from local drawing surface 204 and remote drawing surface 254 are displayed over a static background. For instance, FIG. 5 illustrates an example frame 500 from such a video signal where drawings 502 and 504 are displayed over a plain white background. This configuration can be preferable, for example, if the video stream received from remote collaborative system 252 makes it difficult to see drawings 502 and 504 when laid over the video stream. In these embodiments, the received video stream can still be shown on local drawing surface 204, but may cover a smaller area such as window 506. In a particular embodiment, window 506 can include an even smaller, inset window for displaying the video stream being captured of local user 212.

In the embodiments depicted in FIGS. 4 and 5, various combinations of video streams captured at the local and remote collaborative systems and digital representations of drawings captured at the local and remote collaborative systems can be displayed. In alternative embodiments, other information streams may also be displayed such as information streams comprising a slides presentation, a word processing document, etc. In one embodiment, these other information streams may be incorporated into the video signal that is projected by a projector of a collaborative system. In alternative embodiments, the other information streams may be output from sources other than a projector of the collaborative system. These other sources may be, for example, another projector, a computer, or any output device.

In certain embodiments, local controller 208 can dynamically change the configuration of elements (i.e., drawings, video stream) included in the video signal based on one or more criteria. For example, in a particular embodiment, local controller 208 can dynamically switch between the configuration shown in FIG. 4 and the configuration shown in FIG. 5 based on, e.g., the distance between remote user 262 and remote drawing surface 254. In this embodiment, if remote user 262 moves close to surface 254 (e.g., for the purpose of drawing on the surface), local controller 208 can configure the video signal to display the drawings against a plain background as shown in FIG. 5. If remote user 262 steps away from remote drawing surface 254, local controller 208 can configure the video signal to display the drawings laid over the video stream of remote user 262 as shown in FIG. 4. One of ordinary skill in the art would recognize other variations, modifications, and alternatives.

Figure 6:
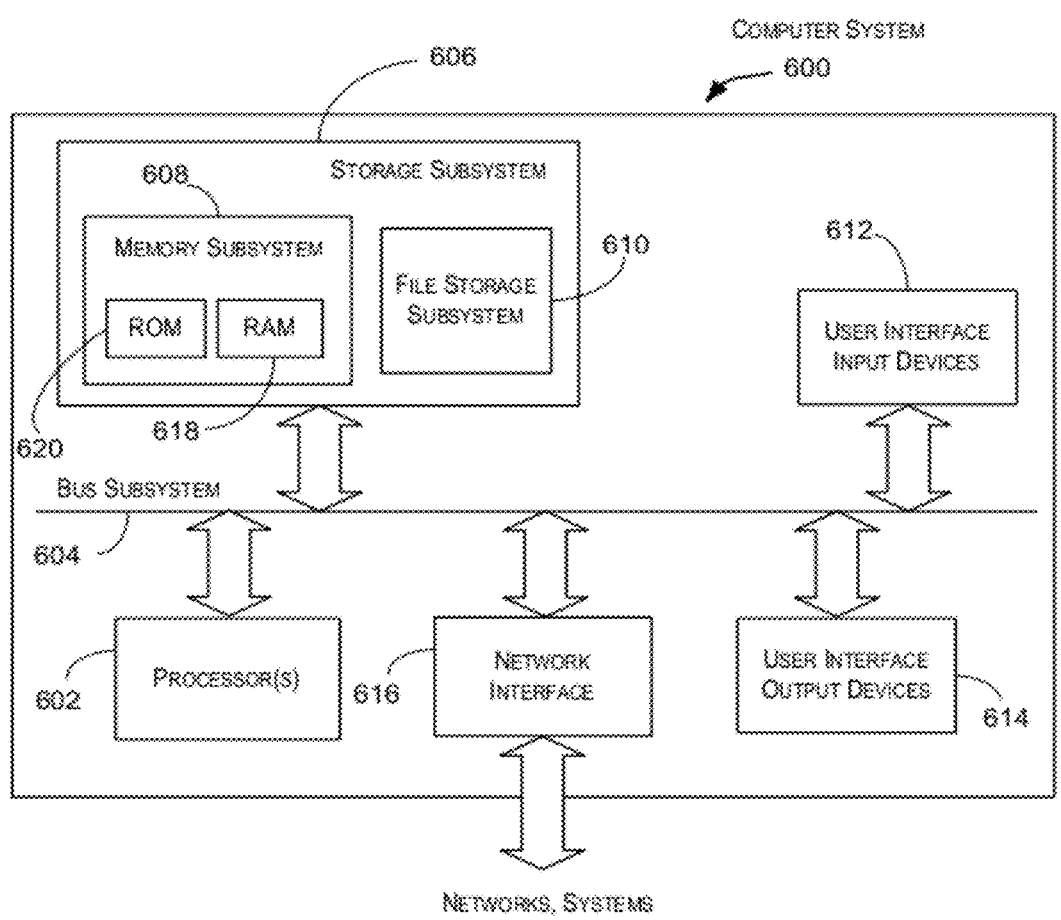
FIG. 6 is a simplified block diagram of a computer system in accordance with an embodiment of the present invention.

FIG. 6 is a simplified block diagram of a computer system 600 according to an embodiment of the present invention. In one set of embodiments, computer system 600 can be used to implement controller 110 illustrated in FIG. 1 and described above. As shown in FIG. 6, computer system 600 can include one or more processors 602 that communicate with a number of peripheral subsystems via a bus subsystem 604. These peripheral subsystems can include a storage subsystem 606, comprising a memory subsystem 608 and a file storage subsystem 610, user interface input devices 612, user interface output devices 614, and a network interface subsystem 616.

Bus subsystem 604 can provide a mechanism for enabling the various components and subsystems of computer system 600 to communicate with each other as intended. Although bus subsystem 604 is shown schematically as a single bus, alternative embodiments of the bus subsystem can utilize multiple busses.

Network interface subsystem 616 can serve as an interface for receiving data from and transmitting data to other systems and/or networks. For example, network interface subsystem 616 can enable the controller of one collaborative system (e.g., local collaborative system 202 of FIG. 2) to communicate with the controller of another remotely located collaborative system (e.g., remote collaborative system 252 of FIG. 2) via a communication network such as the Internet.

User interface input devices 612 can include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 can provide a computer-readable storage medium for storing the basic programming and data constructs that provide the functionality of the present invention. Software (e.g., programs, code modules, instructions, etc.) that when executed by a processor provide the functionality of the present invention can be stored in storage subsystem 606. These software modules or instructions can be executed by processor(s) 602. Storage subsystem 606 can also provide a repository for storing data used in accordance with the present invention. Storage subsystem 606 can comprise memory subsystem 608 and file/disk storage subsystem 610.

Memory subsystem 608 can include a number of memories including a main random access memory (RAM) 618 for storage of instructions and data during program execution and a read only memory (ROM) 620 in which fixed instructions are stored. File storage subsystem 610 can provide a non-transitory persistent (non-volatile) storage for program and data files, and can include a hard disk drive, a floppy disk drive along with associated removable media, a Compact Disk Read Only Memory (CD-ROM) drive, an optical drive, removable media cartridges, and/or other like storage media.

Computer system 600 can be of various types including a personal computer, a phone, a portable computer, a workstation, a network computer, or any other data processing system. Due to the ever-changing nature of computers and networks, the description of computer system 600 depicted in FIG. 6 is intended only as a specific example for purposes of illustrating one embodiment of a computer system. Many other configurations having more or fewer components than the system depicted in FIG. 6 are possible.

Although specific embodiments of the invention have been described, various modifications, alterations, alternative constructions, and equivalents are also encompassed within the scope of the invention. For example, embodiments of the present invention are not restricted to operation within certain specific data processing environments, but are free to operate within a plurality of data processing environments. Further, although embodiments of the present invention have been described using a particular series of transactions and steps, these are not intended to limit the scope of inventive embodiments.

Yet further, while embodiments of the present invention have been described using a particular combination of hardware and software, it should be recognized that other combinations of hardware and software are also within the scope of the present invention. For example, embodiments of the present invention may be implemented only in hardware, or only in software, or using combinations thereof.

The specification and drawings are, accordingly, to be regarded in an illustrative rather than a restrictive sense. It will be evident that additions, subtractions, deletions, and other modifications and changes may be made thereunto without departing from the broader spirit and scope of the invention.

What is claimed is:

1. A collaborative system comprising:
    a drawing surface configured to capture drawings made on the drawing surface by a first user;
    a video camera embedded in the drawing surface, the video camera configured to capture a first video stream of the first user;
    a controller configured to:
        generate, based on information received from the drawing surface, first digital information representing the captured drawings;
        transmit, to a remote collaborative system, the first digital information and the first video stream; and
        receive, from the remote collaborative system, a second video stream of a second user; and
    a projector positioned in front of the drawing surface, the projector configured to project onto the drawing surface a video signal including the captured drawings and the second video stream.

2. The collaborative system of claim 1 wherein the projector has a throw ratio of less than 0.4.

3. The collaborative system of claim 1 wherein the projector is positioned within 60 inches of the drawing surface.

4. The collaborative system of claim 1 wherein the video camera is inset from a front plane of the drawing surface by less than 0.5 inches.

5. The collaborative system of claim 4 wherein, when projecting images onto to the drawing surface, the projector does not cast a substantial amount of light into the lens of the video camera.

6. The collaborative system of claim 1 wherein the controller is further configured to generate the video signal projected onto the drawing surface based on the first digital information and the first video stream.

7. The collaborative system of claim 6 wherein the controller is further configured to receive, from the remote collaborative system, second digital information representing drawings captured by the remote collaborative system.

8. The collaborative system of claim 7 wherein the controller is further configured to generate an updated video signal for projection onto the drawing surface based on the first digital information, the second video stream, and the second digital information, such that the updated video signal includes the drawings captured by the drawing surface, the second video stream, and the drawings captured by the remote collaborative system.

9. The collaborative system of claim 1 wherein, in the video signal, the captured drawings are laid over the second video stream.

10. The collaborative system of claim 1 wherein the second video stream is mirrored prior to being included in the video signal.

11. The collaborative system of claim 1 wherein the drawing surface is greater than 36 inches in width and greater than 24 inches in height.

12. The collaborative system of claim 1 wherein the drawing surface is less than 6 inches in depth.

13. The collaborative system of claim 1 wherein the drawing surface is configured to capture the drawings using one or more pressure or touch sensors.

14. The collaborative system of claim 1 further comprising a microphone configured to capture an audio stream within a vicinity of the collaborative system.

15. The collaborative system of claim 14 wherein the microphone is embedded in the drawing surface.

16. The collaborative system of claim 14 wherein the controller is further configured to transmit the audio stream to the remote collaborative system.

17. A method comprising:
receiving, by a computer system, information captured in response to drawings made by a first user on a drawing surface;
generating, by the computer system based on the received information, first digital information representing the drawings made by the first user;
receiving, by the computer system, a first video stream captured by a video camera embedded in the drawing surface;
transmitting, by the computer system, the first video stream and the first digital information to a remote system;
receiving, by the computer system from the remote system, a second video stream captured by the remote; and
generating, by the computer system, a video signal based on the first digital information and the second video stream, such that the video signal includes the drawings made by the first user and the second video stream,
wherein the video signal is projected onto the drawing surface using a front projector.

18. The method of claim 17 further comprising:
receiving, by the computer system from the remote system, second digital information representing drawings made by a second user of the remote system; and
generating, by the computer system, an updated video signal based on the first digital information, the second video stream, and the second digital information, such that the updated video signal includes the drawings made by the first user, the second video stream, and the drawings made by the second user,
wherein the updated video signal is projected onto the drawing surface using the front projector.

19. A non-transitory computer-readable storage medium having stored thereon program code executable by a processor, the program code comprising:
code that causes the processor to receive information captured in response to drawings made by a first user on a drawing surface;
code that causes the processor to generate, based on the received information, first digital information representing the drawings made by the first user;
code that causes the processor to receive a first video stream captured by a video camera embedded in the drawing surface;
code that causes the processor to transmit the first video stream and the first digital information to a remote system;
code that causes the processor to receive, from the remote system, a second video stream captured by the remote; and
code that causes the processor to generate a video signal based on the first electronic information and the second video stream, such that the video signal includes the drawings made by the first user and the second video stream,
wherein the video signal is projected onto the drawing surface using a front projector.

20. The non-transitory computer-readable storage medium of claim 19 wherein the program code further comprises:
code that causes the processor to receive, from the remote system, second digital information representing drawings made by a second user of the remote system; and
code that causes the processor to generate an updated video signal based on the first digital information, the second video stream, and the second digital information, such that the updated video signal includes the drawings made by the first user, the second video stream, and the drawings made by the second user,
wherein the updated video signal is projected onto the drawing surface using the front projector.

* * * * *